United States Patent
Calixte et al.

(10) Patent No.: US 8,579,436 B2
(45) Date of Patent: Nov. 12, 2013

(54) SINGLE VISION OPHTHALMIC LENS

(75) Inventors: Laurent Calixte, Charenton le Pont (FR); Cyril Guilloux, Charenton le Pont (FR); Isabelle Poulain, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 38 days.

(21) Appl. No.: 13/321,823

(22) PCT Filed: May 20, 2010

(86) PCT No.: PCT/FR2010/050987
§ 371 (c)(1),
(2), (4) Date: Feb. 7, 2012

(87) PCT Pub. No.: WO2010/133813
PCT Pub. Date: Nov. 25, 2010

(65) Prior Publication Data
US 2012/0176583 A1 Jul. 12, 2012

(30) Foreign Application Priority Data

May 20, 2009 (FR) ...................................... 09 53395

(51) Int. Cl.
*G02C 7/02* (2006.01)
*G02C 7/04* (2006.01)
(52) U.S. Cl.
CPC ................ *G02C 7/041* (2013.01); *G02C 7/024* (2013.01)
USPC ............ 351/159.42; 351/159.41; 351/159.01; 351/159.73; 351/159.74
(58) Field of Classification Search
USPC ............. 351/159.01, 159.41–159.43, 159.73, 351/159.75–159.77
See application file for complete search history.

(56) References Cited

U.S. PATENT DOCUMENTS 4,838,674 A * 6/1989 Dufour .................... 351/159.42
4,861,153 A * 8/1989 Winthrop ................ 351/159.42

(Continued)

FOREIGN PATENT DOCUMENTS

DE 42 38 067 5/1993
EP 1 752 815 2/2007

(Continued)

OTHER PUBLICATIONS

Bourdoncle et al.: "Ray Tracing Through Progressive Ophthalmic Lenses," Jun. 1990 International Lens Design Conference, D.T. Moore Ed.
Schuldt: "Ysis-Natürliches sehen erleben" Deutsche Optiker Zeitung, May 1, 2004, pp. 38-43.
Anonymous: "Optique ophtalmique—Verre de lunettes semi-finis-Partie 2: Spécifications pour les verres progressifs" Norme Internationale Feb. 1, 1996, pp. I-8.

*Primary Examiner* — Ricky Mack
*Assistant Examiner* — William Alexander
(74) *Attorney, Agent, or Firm* — Cozen O'Connor

(57) ABSTRACT

An ophthalmic lens including: a prescription control point (P); an upper area having, relative to the point (P), and average-power continuous variation ΔPuiSup that is monotonous between the point (P) and the point (Psup) (maximum variation point in absolute value) where the signed value of the variation $\Delta Pui_{SupMax}=Pui(P_{sup})-Pui(P)$ is between −0.1 and −0.4 dioptres; a lower area having, relative to the point (P), an average power continuous variation $\Delta Pu_{inf}$ that is monotonous between the point (P) and the point $(P_{inf})$ (maximum variation point in absolute value) where the signed value of the variation $\Delta Pui_{infMax}=Pui(P_{inf})-Pui(P)$ is between +0.1 and +0.4 dioptres; the average power gradient being lower than $4.10^{-2} \times \Delta Pui_{total}$, where $\Delta Pui_{total}=|\Delta Pui_{SupMax}|+\Delta Pui_{InfMax}$. Such a lens advantageously takes the accommodative dynamics of the eye into account and increases the visual comfort of the wearer.

18 Claims, 11 Drawing Sheets

(56) References Cited

U.S. PATENT DOCUMENTS

| | | | | |
|---|---|---|---|---|
| 4,988,182 | A | * | 1/1991 | Takahashi et al. ........ 351/159.42 |
| 5,123,725 | A | * | 6/1992 | Winthrop ................... 351/159.42 |
| 5,506,630 | A | * | 4/1996 | Ueno et al. ................ 351/159.42 |
| 5,557,348 | A | * | 9/1996 | Umeda et al. ............. 351/159.42 |
| 5,726,734 | A | * | 3/1998 | Winthrop ................... 351/159.42 |
| 6,318,859 | B1 | * | 11/2001 | Baudart et al. ............ 351/159.42 |
| 6,652,096 | B1 | * | 11/2003 | Morris et al. .............. 351/159.42 |
| 7,040,758 | B2 | * | 5/2006 | Yamamoto ................ 351/159.42 |
| 7,413,303 | B2 | * | 8/2008 | Guilloux et al. .......... 351/159.46 |
| 2008/0246914 | A1 | * | 10/2008 | Carimalo et al. ............. 351/169 |
| 2009/0244480 | A1 | * | 10/2009 | De Gaudemaris et al. ... 351/169 |

FOREIGN PATENT DOCUMENTS

| | | |
|---|---|---|
| EP | 1 835 328 | 9/2007 |
| FR | 2 753 805 | 3/1998 |
| WO | WO 97/26579 | 7/1997 |
| WO | WO 00/73846 | 12/2000 |
| WO | WO 2006/003275 | 1/2006 |
| WO | WO 2008/037892 | 4/2008 |

* cited by examiner

SINGLE VISION OPHTHALMIC LENS

RELATED APPLICATIONS

This is a U.S. National Stage of application No. PCT/FR2010/050987, filed on May 20, 2010.

This application claims the priority of French application Ser. No. 09/53395 filed May 20, 2009, the entire content of which is hereby incorporated by reference.

FIELD OF THE INVENTION

The invention relates to a single vision ophthalmic lens intended to be worn in an eyeglass frame.

BACKGROUND OF THE INVENTION

For each single vision ophthalmic lens intended to be worn in an eyeglass frame, there is an associated prescription for a given viewing distance. The ophthalmic prescription for this viewing distance can include a power value, positive or negative, as well as an astigmatism value and axis. This prescription compensates for the visual deficiency of the wearer, by means of the lens. The lens is mounted in the frame as a function of the position of the wearer's pupil relative to the frame, for the given viewing distance and viewing direction.

In the simplest case of conventional single vision lenses, the front and rear faces of these lenses are spherical surfaces, or toric if the prescription includes an astigmatism.

Advances have been made to improve the vision and increase the comfort of the wearer compared to conventional single view lenses.

A lens of the invention is single vision in the sense that it corresponds to a given single vision prescription, but this lens may present power and/or astigmatism variations around the prescribed values.

A first family of ophthalmic lens, of the improved single vision type and intended to correct the vision of a wearer, is known as the "aspheric lens" family. In this family, the optical quality of the glass is improved by optimizing the visual aberrations (for example deviations in power and astigmatism relative to the prescription) of the lens.

Another family of ophthalmic lens of the improved single vision type, intended to correct the vision of an ametropic non-presbyopic wearer, is disclosed in patent FR 2 871 247. The lenses described are adapted for esophoric ametropic non-presbyopic wearers, who experience visual fatigue when they are using their near vision for a prolonged period of time. A wearer may have heterophoria or phoria, meaning a deviation of the two visual axes relative to the point of fixation when binocular vision is dissociated. Phoria is evidenced as a modification of the visual axes when binocular vision is dissociated. In other words, in the active position—with binocular vision—the visual axes intersect at the point of fixation; in the passive position, in the absence of fusion stimulus or by eliminating any fusion and peripheral stimulation, the visual axes no longer pass through the point of fixation. For more details on the definition of phoria, one may consult Darras C., *Eléments et réflexions d'optique physiologique* (Elements and thoughts on physiological optics), ERA Edition, 1995.

The improved single vision ophthalmic lenses disclosed in patent FR 2 871 247 are specifically meant for wearers suffering from visual fatigue.

SUMMARY OF THE INVENTION

The present invention concerns any wearer (ametropic and/or presbyopic) for whom single vision eyewear has been prescribed.

One object of the invention is to offer the wearer an improved single vision ophthalmic lens which increases the clarity and quality of the wearer's vision when compared to a known single vision or aspheric lens.

One aspect of the invention is directed to an ophthalmic lens for a given wearer, intended to be worn in an eyeglass frame, comprising:
- a prescription control point P corresponding to a downward gaze $\alpha_P$ of between $-10°$ and $+25°$ and a lateral gaze displacement $\beta_P$ of between $-10°$ and $+10°$,
- an upper area defined by downward gaze values, $\alpha$, for the wearer, of between $\alpha_P-30°$ and $\alpha_P$, along a downward gaze path, and by lateral gaze displacement values, $\beta$, for the wearer, of between $\beta_P-30°$ and $\beta_P+30°$, parallel to a lateral gaze displacement axis,
- a lower area defined by downward gaze values, $\alpha$, for the wearer, of between $\alpha_P$ and $\alpha_P+30°$, along a downward gaze path, and by lateral gaze displacement values, $\beta$, for the wearer, of between $\beta_P-30°$ and $\beta_P+30°$, parallel to a lateral gaze displacement axis; and/or:
- the power of the lens at point P is substantially equal to the prescription of the wearer,
- the upper area has, relative to the point P, along the downward gaze path, a continuous average power variation $\Delta\text{Pui}_{Sup}$, monotonic between the point P and a point $P_{Sup}$, which is the point of the maximum amplitude in the variation of the power value, as an absolute value, and where the value of the average power deviation between the points $P_{Sup}$ and P, $\Delta\text{Pui}_{SupMax}=\text{Pui}(P_{Sup})-\text{Pui}(P)$, is between $-0.1$ and $-0.4$ dioptres (where "Pui" stands for "power" and "Sup" stands for "upper area"),
- the lower area has, relative to the point P, along the downward gaze path, a continuous variation in the average power $\Delta\text{Pui}_{Inf}$, monotonic between the point P and a point $P_{Inf}$, which is the point of the maximum amplitude in the variation of the power value, as an absolute value, and where the value of the average power deviation between the points $P_{Inf}$ and P, $\Delta\text{Pui}_{InfMax}=\text{Pui}(P_{Inf})-\text{Pui}(P)$ is between $+0.1$ and $+0.4$ dioptres (where "Pui" stands for "power" and "Inf" stands for "lower area"),
- the average power gradient along the downward gaze path is less than $4.10^{-2}\times\Delta\text{Pui}_{total}$, where $\Delta\text{Pui}_{total}=|\Delta\text{Pui}_{SupMax}|+\Delta\text{Pui}_{InfMax}$ and said average power gradient is expressed in dioptres per degree.

The downward gaze path is also commonly referred to as the "meridian."

"The power of the lens is equal to the prescription of the wearer" is understood to mean a configuration in which the power of the lens is equal, plus or minus any measurement errors, to the defined prescription in "wearer" mode or in "lensmeter" mode according to conventional techniques in ophthalmic optics.

"Average power gradient along the downward gaze path" is understood to mean a variation in the average power relative to an angular variation along the downward gaze path.

The inventors have noted that such a lens advantageously can take into account the accommodative dynamics of the eye and thus increase the visual comfort of the wearer.

In different embodiments, which may be combined in any possible combinations:
- the wearer is a reference wearer defined by the following parameters:
  - distance between the eye's center of rotation (ECR) and the rear face of the ophthalmic lens, along a line of viewing $(\alpha,\beta)=(0,0)$ equal to 25.5 mm;
  - pantoscopic tilt of $8°$,
  - base curve of $0°$, the ophthalmic lens is associated with information which allows positioning the control point P on said lens and locating the top and bottom of said lens, said information being chosen, for example, from among one or more elements of the list consisting of micro-gravure, temporary marking, mounting chart, manufacturer catalog, and optionally, positional reference means on the nasal and/or temporal side of the lens; other means known to a person skilled in the art which allow providing information for positioning the control point P could additionally or alternatively be used;

the maximum value of the power variation $|\Delta Pui_{SupMax}|$ and/or the value of $\Delta Pui_{InfMax}$ is greater than or equal to 0.15 dioptres and less than or equal to 0.30 dioptres, the maximum value of the power variation $|\Delta Pui_{SupMax}|$ is greater than or equal to $0.5 \times \Delta Pui_{InfMax}$ and/or less than or equal to $2 \times \Delta Pui_{InfMax}$, for example greater than or equal to $0.75 \times \Delta Pui_{InfMax}$ and/or for example less than or equal to $1.5 \times \Delta Pui_{InfMax}$, the resulting astigmatism is less than or equal to $1.25 \times \Delta Pui_{total}$, expressed in dioptres, for the entirety of the upper and lower areas; in one exemplary embodiment the resulting astigmatism is less than or equal to $0.9 \times \Delta Pui_{total}$, expressed in dioptres, for the entirety of the upper and lower areas, the average power gradient along the downward gaze path is less than or equal to $3.10^{-2} \times \Delta Pui_{total}$, or even less than or equal to $2.75^{-2} \times \Delta Pui_{total}$ for example, expressed in dioptres per degree, the absolute values of the average power variation $\Delta Pui_{Inf}$ and $\Delta Pui_{Sup}$ are equal, and/or the points $P_{Sup}$ and $P_{Inf}$ are symmetrical in relation to P, the downward gaze path is rectilinear, the front and/or rear surface is chosen from the list consisting of a spherical surface, an aspheric surface, a complex surface such as a progressive surface for example, or a surface resulting from a combination of multiple surfaces.

In the present invention, "pantoscopic tilt" is understood to mean an angle in a vertical plane formed by the visual axis of an eye in primary viewing position and by the normal to the plane tangential to the rear face of the lens at the intersection of the primary viewing direction with the lens.

"Primary position" is understood the mean the position of the eye relative to the head, when looking straight ahead at an object situated at eye level.

These definitions are in accordance with the principles stated in ISO standard 13666 (first edition 1998-08-01) concerning the vocabulary of ophthalmic optics and spectacle lenses.

"Base curve" is understood to mean an angle in a horizontal plane formed by the visual axis of an eye in primary viewing position and by the normal to the plane tangential to the rear face of the lens at the intersection of the primary viewing direction with the lens.

Another aspect of the invention relates to a method, implemented by computerized means, for calculating the optical system (OS) of an ophthalmic lens intended to be worn in an eyeglass frame and personalized for a given wearer, comprising the following steps:
  providing the prescription of the wearer,
  defining a distance between the eye's center of rotation (ECR) and the rear face of the ophthalmic lens, along a line of viewing $(\alpha, \beta)$ of the wearer,
  defining a pantoscopic tilt,
  defining a base curve,
  defining a control point P for the prescription corresponding to a downward gaze $\alpha_P$ of between $-10°$ and $+25°$ and a lateral gaze displacement $\beta_P$ of between $-10°$ and $+10°$ where the power of the lens at point P is equal to the prescription of the wearer,
  defining an upper area defined by downward gaze values, $\alpha$, for the wearer, of between $\alpha_P - 30°$ and $\alpha_P$, along a downward gaze path, and by lateral gaze displacement values, $\beta$, for the wearer, of between $\beta_P - 30°$ and $\beta_P + 30°$, parallel to a lateral gaze displacement axis,
  defining a lower area defined by downward gaze values, $\alpha$, for the wearer, of between $\alpha_P$ and $\alpha_P + 30°$, along a downward gaze path, and by lateral gaze displacement values, $\beta$, for the wearer, of between $\beta_P - 30°$ and $\beta_P + 30°$, parallel to a lateral gaze displacement axis,
  and where said ophthalmic lens is calculated in a manner such that:
    the power of the lens at point P is substantially equal to the prescription of the wearer,
    the upper area has, relative to point P, along the downward gaze path, a continuous variation in the average power $\Delta Pui_{Sup}$, monotonic between point P and a point $P_{Sup}$, which is the point of the maximum amplitude in the variation of the power value, as an absolute value, and where the value of the average power deviation between the points $P_{Sup}$ and P, $\Delta Pui_{SupMax} = Pui(P_{Sup}) - Pui(P)$, is between $-0.1$ and $-0.4$ dioptres,
    the lower area has, relative to the point P, along the downward gaze path, a continuous variation in the average power $\Delta Pui_{Inf}$, monotonic between the point P and a point $P_{Inf}$, which is the point of the maximum amplitude in the variation of the power value, as an absolute value, and where the value of the average power deviation between the points $P_{Inf}$ and P, $\Delta Pui_{InfMax} = Pui(P_{Inf}) - Pui(P)$, is between $+0.1$ and $+0.4$ dioptres,
    the average power gradient along the downward gaze path is less than $4.10^{-2} \times \Delta Pui_{total}$, where $\Delta Pui_{total} = |\Delta Pui_{SupMax}| + \Delta Pui_{InfMax}$ and said average power gradient is expressed in dioptres per degree.

"Defining" a parameter is understood to mean the fact of introducing a numerical value chosen for this parameter in order to perform the calculation according to the above method.

In one embodiment, the optical system (OS) of said lens is calculated by a method comprising an optimization step. In particular it is possible to define a working lens equal to an initial lens, and a target lens, and from these an optimized lens is determined by optimization while minimizing the difference between parameter values for the working lens and for the target lens. An example of such a calculation method is found in patent EP0990939. Any other optimization method known to a person skilled in the art can also be used.

In one embodiment, the wearer is considered to be a reference wearer defined by the following parameters:
  the distance between the eye's center of rotation (ECR) and the rear face of the ophthalmic lens, along a line of viewing $(\alpha, \beta) = (0,0)$, is equal to 25.5 mm,
  the pantoscopic tilt is 8°,
  the base curve is 0°.

In another embodiment, the distance between the ECR of the eye of a wearer and the rear face of the ophthalmic lens, along a line of viewing $(\alpha, \beta) = (0,0)$, is measured for the eye of this wearer.

Such a measurement can in particular be made according to the method described in patent WO 2008/132356, or the one described in patent EP 1154302.

When the measurement is made in two steps by determining the rear face of the lens/cornea of the eye distance, then adding the cornea/ECR distance, a cornea/ECR distance of 13.5 mm is chosen for example.

One should note that any other appropriate method can also be used which allows directly or indirectly determining the ECR of the wearer's eye/rear face of the lens distance.

It is also possible to choose a pantoscopic tilt different from 8° and a base curve different from 0°.

Another aspect of the invention relates to a method for manufacturing such an ophthalmic lens intended to be worn in an eyeglass frame and personalized for a given wearer, comprising the following steps, providing the optical system (OS) of an ophthalmic lens personalized for a given wearer, calculated according to the above calculation method, supplying a semi-finished product adapted for machining an ophthalmic lens, machining the semi-finished product in a manner that creates an ophthalmic lens having the characteristics of the optical system provided.

In one embodiment, the ophthalmic lens is associated with information which allows positioning the control point P on said lens and locating the top and bottom of said lens, said information being chosen, for example, from among one or more of the elements in the list consisting of micro-gravure, temporary marking, mounting chart, manufacturer catalog, and optionally, positional reference means on the nasal and/or temporal side of the lens.

Another aspect of the invention relates to a method for increasing the sharpness of vision and visual comfort of a non-presbyopic ametropic wearer while taking into account the accommodative dynamics of the eye, where an ophthalmic lens, intended to be worn in an eyeglass frame, is provided to said wearer.

BRIEF DESCRIPTION OF THE DRAWINGS

Other features and advantages of the invention will be apparent from reading the following description of certain of its embodiments, provided as examples and referring to the drawings which show.

DETAILED DESCRIPTION OF THE DRAWINGS

In the following description, the terms top and bottom, horizontal and vertical are used relative to the point P of the lens unless specifically stated otherwise.

In a known manner, a mean sphere D is defined for every point on a complex surface, given by the formula:

$$D = \frac{n-1}{2}\left(\frac{1}{R_1} + \frac{1}{R_2}\right)$$

where $R_1$ and $R_2$ are the maximum and minimum radii of curvature expressed in meters, and n is the refractive index of the material constituting the lens.

A cylinder C is also defined, given by the formula:

$$C = (n-1)\left|\frac{1}{R_1} - \frac{1}{R_2}\right|.$$

The characteristics of the surfaces of the lens can be expressed using the mean sphere and the cylinder.

For a given lens, corresponding optical characteristics are defined, meaning a power and an astigmatism.

Figure 1:
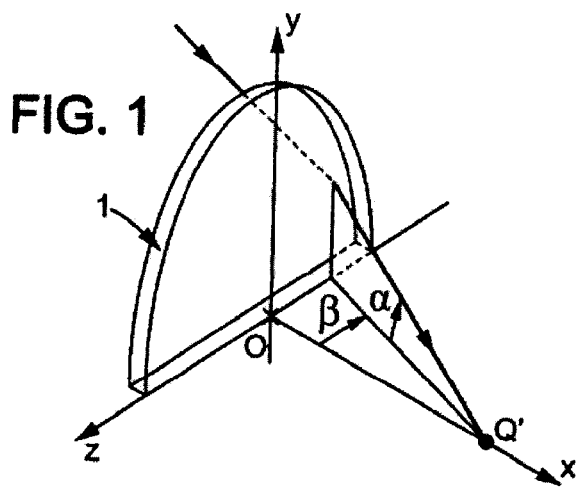
in FIGS. 1 to 3, schematic representations of an eye-lens system, in FIG. 4, an astigmatism and power variation profile along the meridian of the lens in a first embodiment of the invention, in FIG. 5, an average power chart for the lens in FIG. 4, in FIG. 6, a resulting astigmatism chart for the lens in FIG. 4, in FIGS. 7 to 9, FIGS. 10 to 12, FIGS. 13 to 15, and FIGS. 16 to 18, figures similar to FIGS. 4 to 6 for a lens according to other embodiments of the invention.
Figure 2:
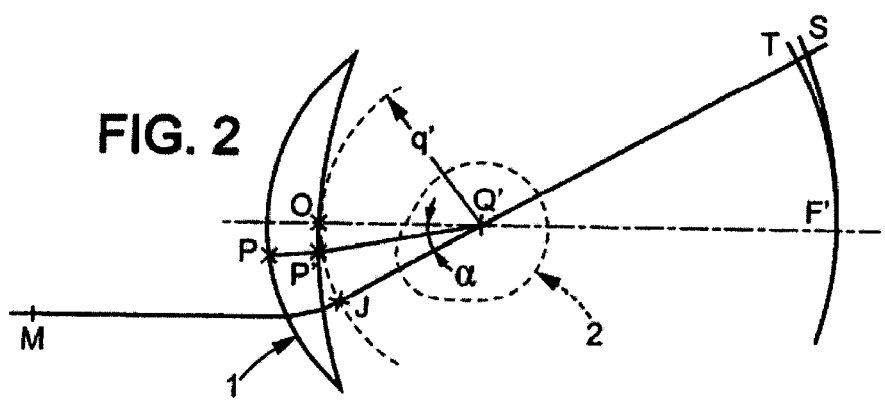
Figure 3:
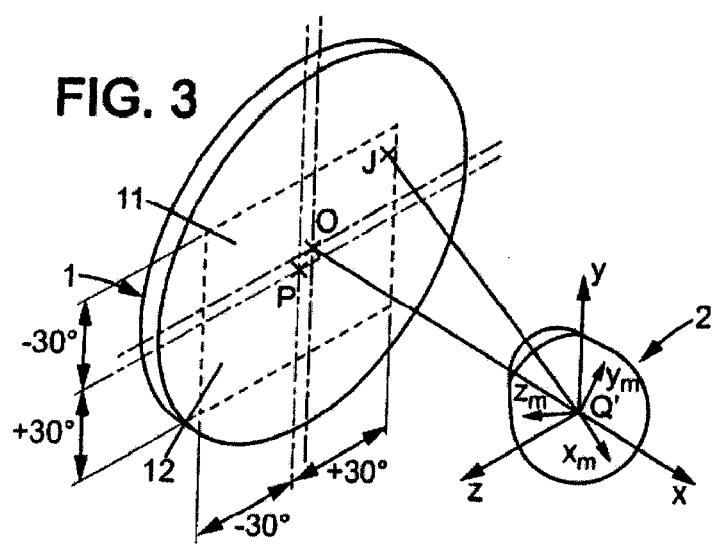

FIGS. 1 to 3 show diagrams of eye and lens optical systems to illustrate the definitions used in the description.

FIG. 1 represents a diagram of a perspective view of such a system, illustrating the parameters α and β used to define a viewing direction.

FIG. 2 represents a view in a vertical plane parallel to an axis anteroposterior to the wearer's head and passing through the eye's center of rotation, in a case where β=0.

FIG. 3 represents a perspective view in a configuration where α and β are non-zero, showing a fixed reference system {x, y, z} and a reference system {$x_m$, $y_m$, $z_m$} linked to the eye in order to demonstrate the rotation of the eye.

Q' is the center of rotation of the eye; the axis Q'F' is the horizontal axis passing through the eye's center of rotation and extending in front of the wearer—in other words the axis Q'F' corresponds to the primary viewing direction. Which is the point 0, the point of intersection of the rear surface of the lens and of this axis Q'F'. A sphere of vertices is defined, centered on Q' and of radius q', which is tangential to the rear surface of the lens at a point on the horizontal axis. As an example, a value of 25.5 mm for the radius q' corresponds to a common value.

A given viewing direction corresponds to a position of the eye rotating around Q' and to a point J on the sphere of vertices; the angle β is the angle formed between the axis Q'F' and the projection of the line Q'J onto the horizontal plane containing the axis Q'F'. The angle α is the angle formed between the axis Q'J and the projection of the straight line Q'J onto the horizontal plane containing the axis Q'F'. A given viewing direction therefore corresponds to a point J of the sphere of vertices or to a pair of values (α,β). The more positive the value of the downward gaze the more the gaze is downward, and when the value is negative the gaze is raised. The image of a point in the object space, in a viewing direction and at a given object distance, is formed between two points S and T corresponding to minimum and maximum focal distances, which would be sagittal and tangential focal distances in the case of surfaces of revolution. On the optical axis, the image of a point of the object space at infinity is formed at point F'.

A control point P is defined for the prescription where the optical power and the astigmatism corresponding to the wearer's prescription are required. This control point P is situated in an area corresponding to a downward gaze $\alpha_P$ of between −10° and +25° and a lateral gaze displacement $\beta_P$ of between −10° and +10°.

Ergorama is a function associating with each viewing direction the usual distance of the object point. Typically, for far vision in the primary viewing direction, the object point is at infinity. For more details on a possible definition of ergorama, consult FR-A-2,753,805 (U.S. Pat. No. 6,318,859). This document describes an ergorama, its definition, and its modeling method. A particular ergorama consists of only taking points at infinity. For the method of the invention, one can consider points at infinity or not at infinity. Ergorama can also be a function of the ametropia of the wearer.

Using these elements, one can define a power and an astigmatism in each viewing direction. For a viewing direction $(\alpha,\beta)$, consider an object point M at an object distance given by the ergorama. In the object space, for the point M on the corresponding light ray, the nearness ProxO is defined as the inverse of the distance MJ between point M and point J on the sphere of vertices:

$$\text{Prox}O = 1/MJ$$

This makes it possible to calculate the nearness of the object in the context of a thin lens approximation at every point of the sphere of vertices. For an actual lens, it is possible, using a ray tracing program, to consider the nearness of an object as being the inverse of the distance between the object point and the front surface of the lens, on the corresponding ray.

Still for the same viewing direction $(\alpha,\beta)$, the image of a point M having a given nearness is formed between two points S and T respectively corresponding to a minimum and maximum focal length (which would be sagittal and tangential focal length in the case of surfaces of revolution). The quantity Prox I defined as:

$$\text{Prox}I = 0.5 \cdot ((1/JT) + (1/JS))$$

is called the nearness of the image for point M.

By analogy with the case of the thin lens, one thus defines, in a given viewing direction and for a given nearness of an object, i.e. for a point in object space on the corresponding light ray, an optical power Pui as being the sum of the nearness of the image and the nearness of an object:

$$Pui = \text{Prox}O + \text{Prox}I$$

Using the same notation, in each viewing direction and for a given nearness of an object, an astigmatism A is defined as $$A = \left| \frac{1}{JT} - \frac{1}{JS} \right|$$

This definition corresponds to the astigmatism value for the bundle of rays created by the lens. The angle of the astigmatism, commonly called the axis, is the angle $\gamma$ measured in the reference system $(Q', x_m, y_m, z_m)$ linked to the eye, relative to the direction $z_m$, with which the image S or T is formed as a function of the convention used, in the plane $(Q', z_m, y_m)$.

The resulting astigmatism is defined as being the difference between the prescribed astigmatism and the astigmatism generated by the lens.

Thus we obtain the definitions of the invention for the optical power and astigmatism of the lens, under wearing conditions, which can be calculated for example as explained in B. Bourdoncle et al., Ray tracing through progressive ophthalmic lenses, 1990 International Lens Design Conference, D. T. Moore ed., Proc. Soc. Photo. Opt. Instrum. Eng. In one embodiment, standard wearing conditions are understood to mean the position of the lens relative to the eye of the average wearer, defined in particular by a pantoscopic tilt of 8°, a lens-eye distance of 12 mm, and a base curve of 0°. Other conditions can also be used. Thus the parameters for a given lens can be calculated using a ray tracing program. In the invention, the optical power and the astigmatism can be calculated such that the prescription is reached at the control point P either for a wearer wearing his lenses under the wearing conditions or as measured by a lensmeter.

FIG. 3 shows the position of the eye and the reference system linked to it in one direction $(\alpha,\beta)$. A fixed reference system $\{x, y, z\}$ and a reference system $\{x_m, y_m, z_m\}$ linked to the eye are represented in FIG. 3, to better show the rotation of the eye. The reference system $\{x, y, z\}$ has the point Q' as its origin; the x axis is the axis Q'F'—the point F' not being represented in FIG. 3—and passes through the point 0; the direction of this axis is from the lens to the eye. The plane $\{y, z\}$ is the vertical plane; the y axis is vertical and directed upwards; the z axis is horizontal, the reference system being direct orthonormal. The reference system $\{x_m, y_m, z_m\}$ linked to the eye has the point Q' as its center; the $x_m$ axis is given by the viewing direction JQ' and coincides with the reference system $\{x, y, z\}$ for the primary viewing direction.

The point P is positioned in FIG. 3 by its angular coordinates $\alpha_P$, $\beta_P$. FIG. 3 shows the upper area 11 defined by downward gaze values a, for the wearer, of between $\alpha_P - 30°$ and $\alpha_P$, along a downward gaze path, and by lateral displacement values $\beta$, for the wearer, of between $\beta_P - 30°$ and $\beta_P + 30°$, parallel to a lateral gaze displacement axis, as well as the lower area 12 defined by downward gaze values $\alpha$, for the wearer, of between $\alpha_P$ and $\alpha_P + 30°$, along a downward gaze path, and by lateral displacement values $\beta$, for the wearer, of between $\beta_P - 30°$ and $\beta_P + 30°$, parallel to a lateral gaze displacement axis.

The lens is described below with reference to different embodiments. A first embodiment of the invention, denoted EX1, is described with reference to FIGS. 4 to 6.

In this example, the wearer's prescription for far vision is −6 dioptres. The charts shown correspond to optical analyses of the lens placed in front of the wearer's eye under standard previously defined wearing conditions and for object points at infinity (ProxO=0).

In these examples, the lens is mounted as a standard single vision lens and the point P is positioned in front of the pupil of the wearer.

The optical function of the lens is substantially symmetrical relative to the line of downward gaze. In this example, the line of downward gaze is vertical. This allows using the same lens for the right eye and for the left eye. The lens can be mounted in the frame while keeping a vertical axis of symmetry. It remains possible to have an assembly in which the line of downward gaze is tilted.

A centering point can be used by opticians to position the lens in the frame and can be defined in one of the following ways: the point situated on the lens in the middle between two etched markings; the point physically indicated on the lens before assembly in the frame, by a cross or any other mark such as a point surrounded with a circle drawn on the lens. As explained below, this point is advantageously used in assembling the lens in the frame.

In some embodiments, the centering point can be combined with the point P or can be separate from it, depending on the chosen type of lens assembly. In the different embodiments presented, the point P is combined with the centering point.

Figure 4:
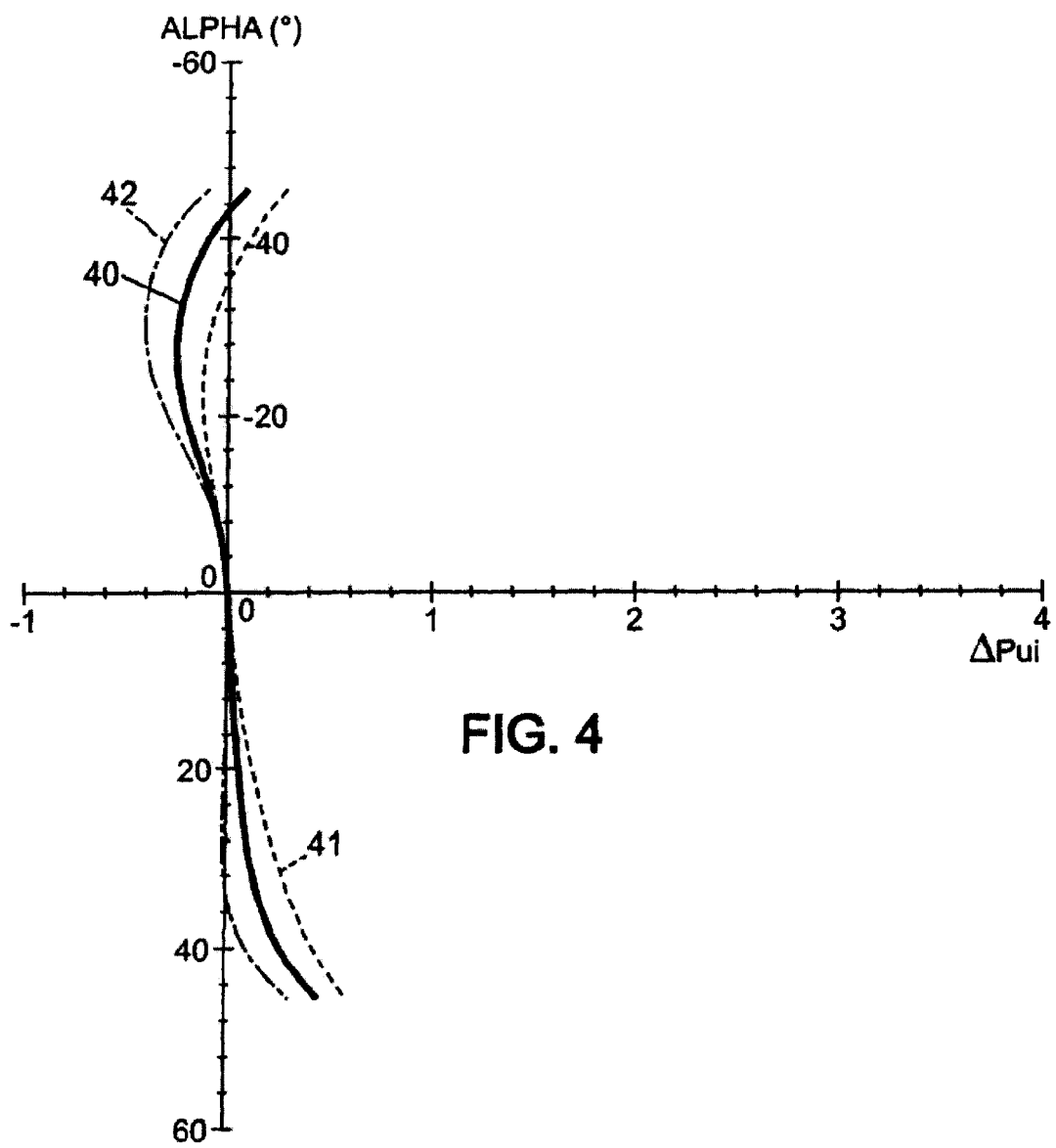

FIG. 4 shows a diagram of the variations in the minimum power 42 (dotted and dashed line), maximum power (dotted line) and mean power 40 (solid line), in dioptres (x axis), as a function of the downward gaze a in degrees (y axis), along the meridian (or downward gaze path) of the lens, according to the first embodiment of the invention. The values are normalized at the origin where the average power is −6 dioptres, which is the prescription for the wearer considered in the analysis.

Figure 5:
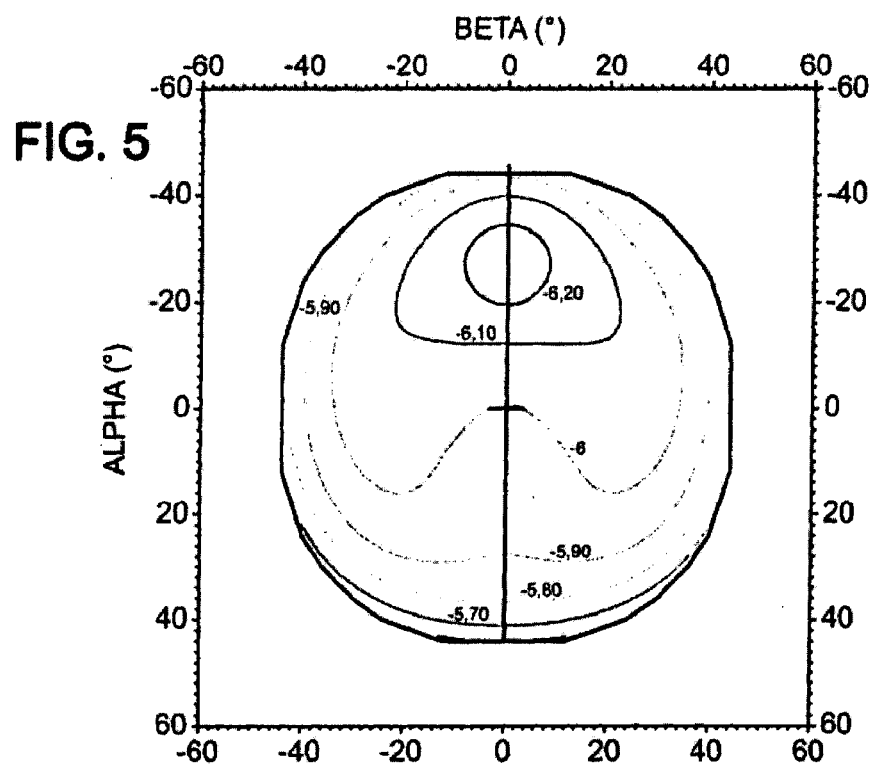

FIG. 5 shows an average power chart for the lens in FIG. 4. As is usual, the isopower lines have been added to FIG. 5. These lines are formed of points having the same average power value. In FIG. 5, isopower contours 0.10 dioptre apart are represented.

Figure 6:
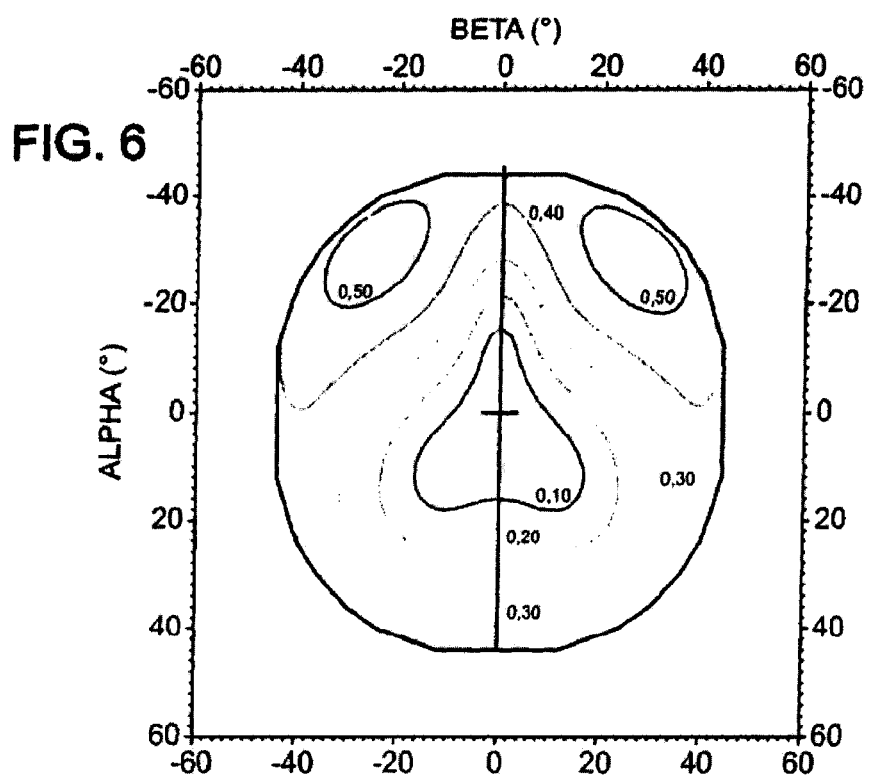

FIG. 6 shows a resulting astigmatism chart (as defined in the text above) for the lens in FIG. 4. Represented in FIG. 6 are the resulting isoastigmatism lines 0.10 dioptre apart. These lines are symmetrical relative to the vertical axis of the lens.

The lens in FIGS. 4 to 6 is mounted in the following manner. The position of the wearer's pupil in the frame is measured in a known manner for far vision, height and monocular pupillary distance. The lens is then mounted into the frame so that the centering point for the lens is in the measured position while ensuring that the demarcation of the upper and lower areas is horizontal. In the upper part of the lens, the average power variation provided to the wearer relative to his prescription reaches about −0.28 dioptres ($\Delta Pui_{SupMax}$), and in the lower part of the lens, this average power variation reaches about 0.12 ($\Delta Pui_{InfMax}$) dioptres. The wearer therefore has a compensation in the upper area that is slightly more negative than what was prescribed, and a compensation in the lower area that is slightly less negative than what was prescribed.

The inventors were able to observe that the result is improved visual clarity and comfort.

The other figures illustrate other embodiments of the invention, denoted EX2 to EX5.

Figure 7:
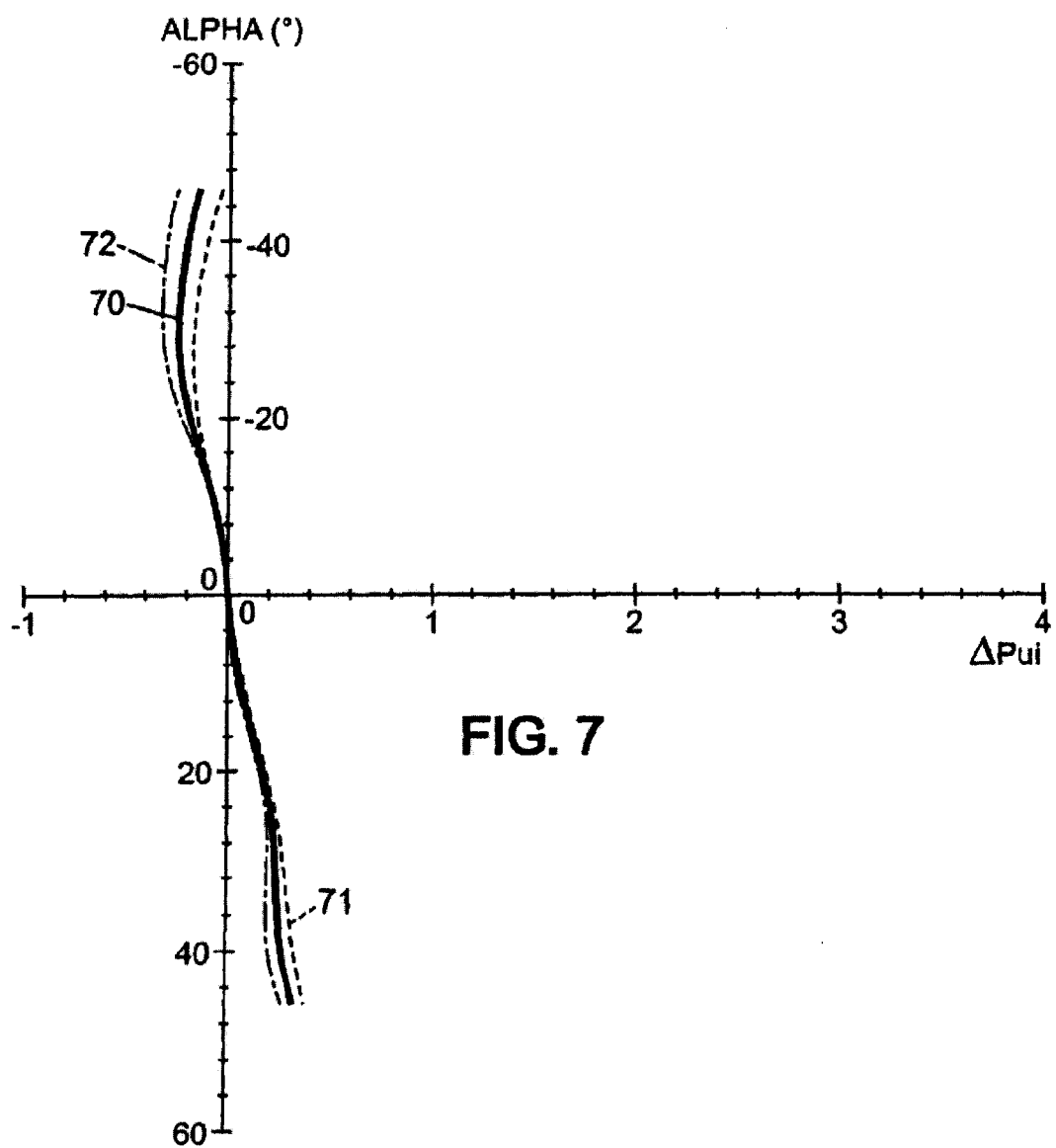
Figure 8:
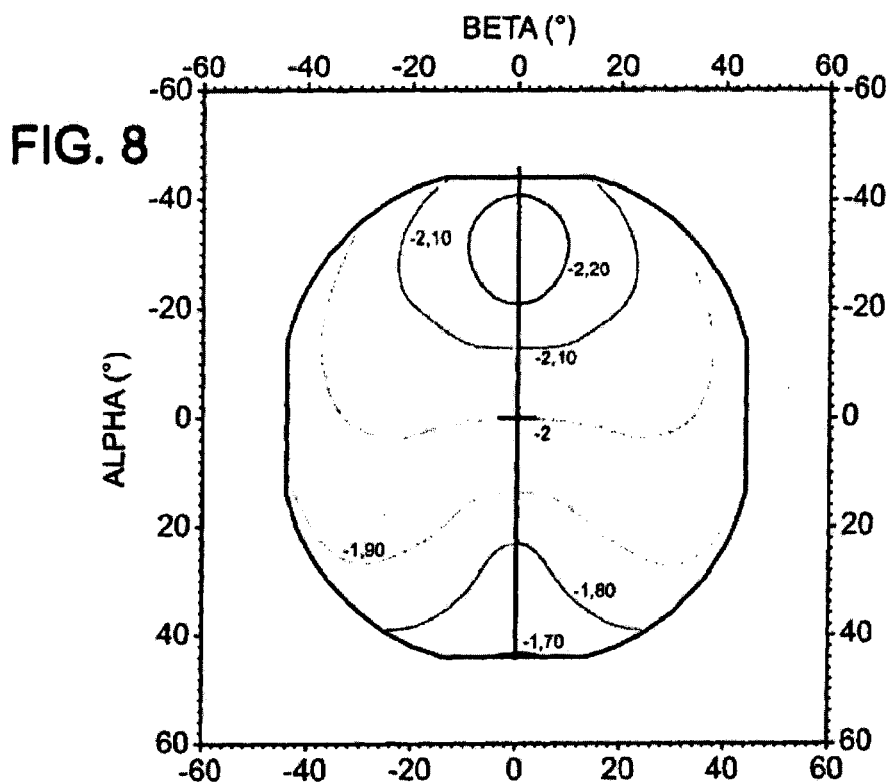
Figure 9:
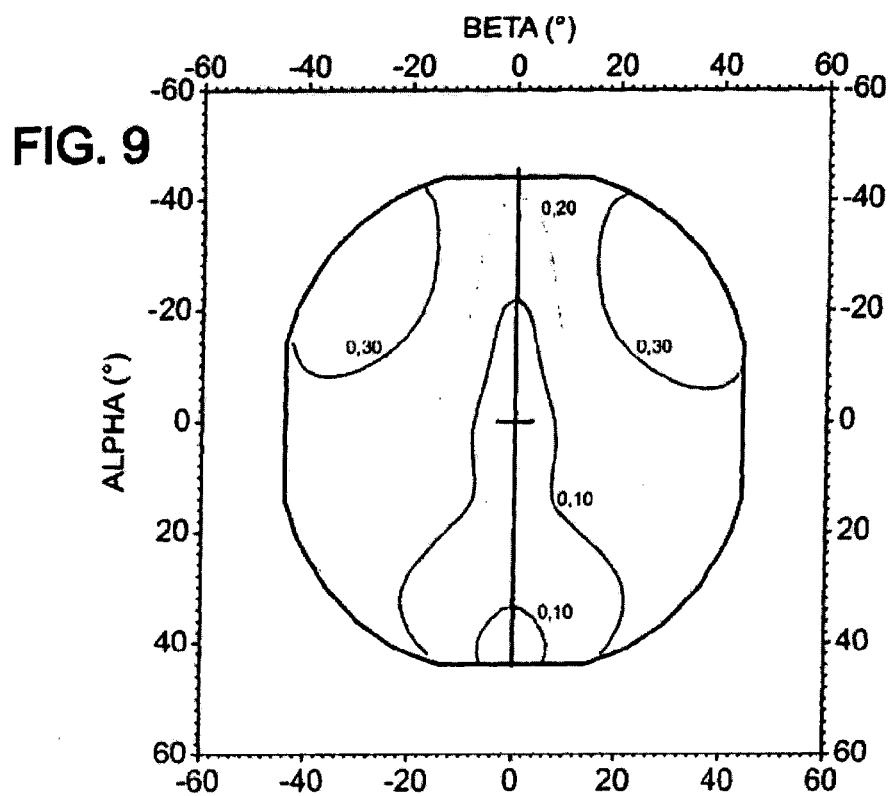
Figure 10:
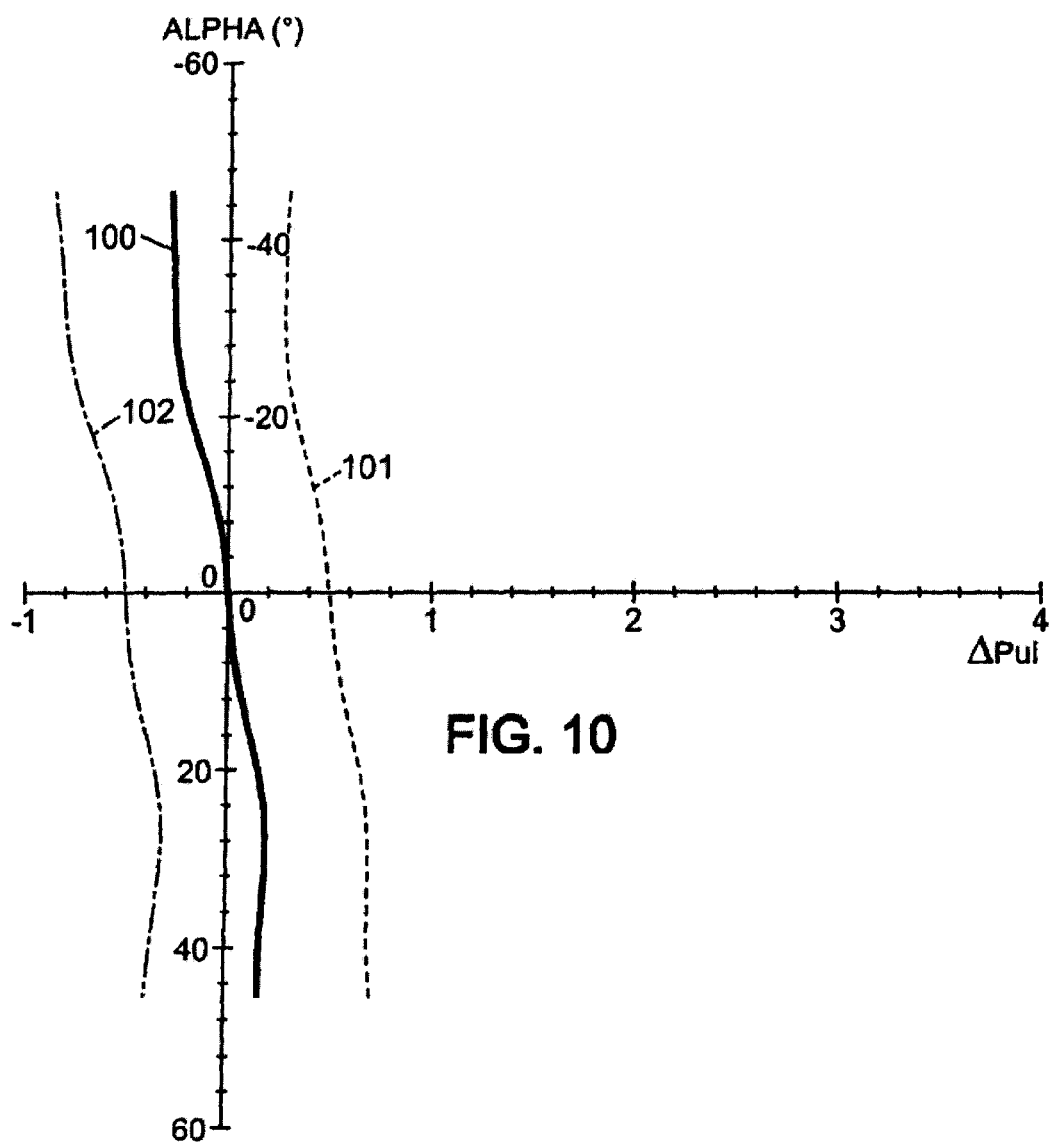
Figure 11:
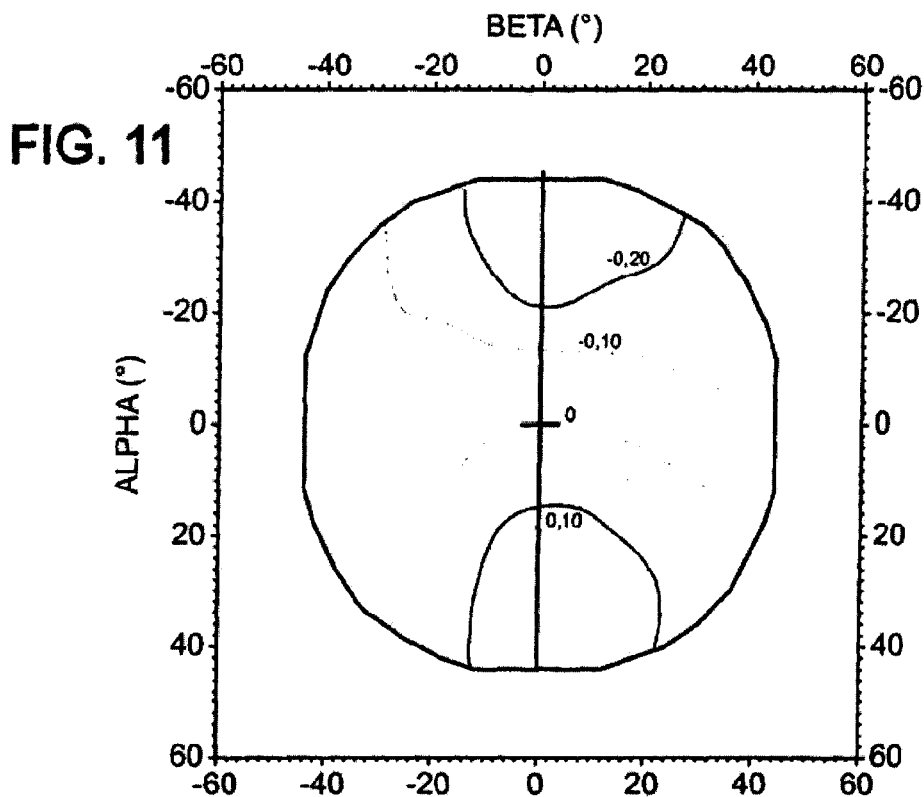
Figure 12:
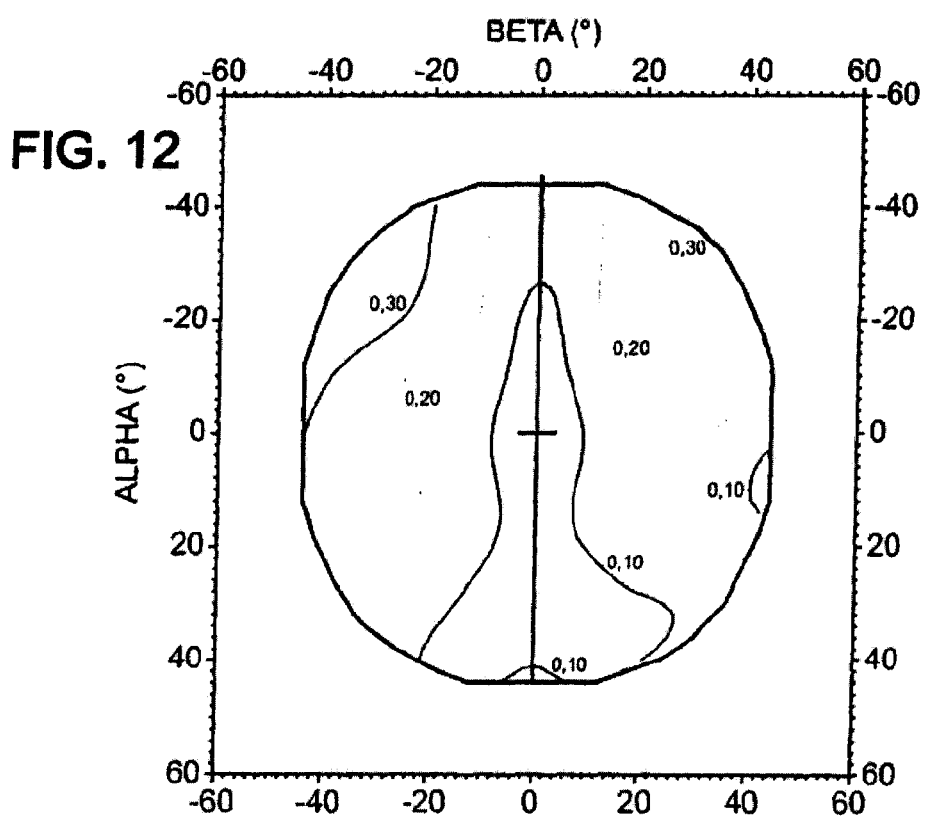
Figure 13:
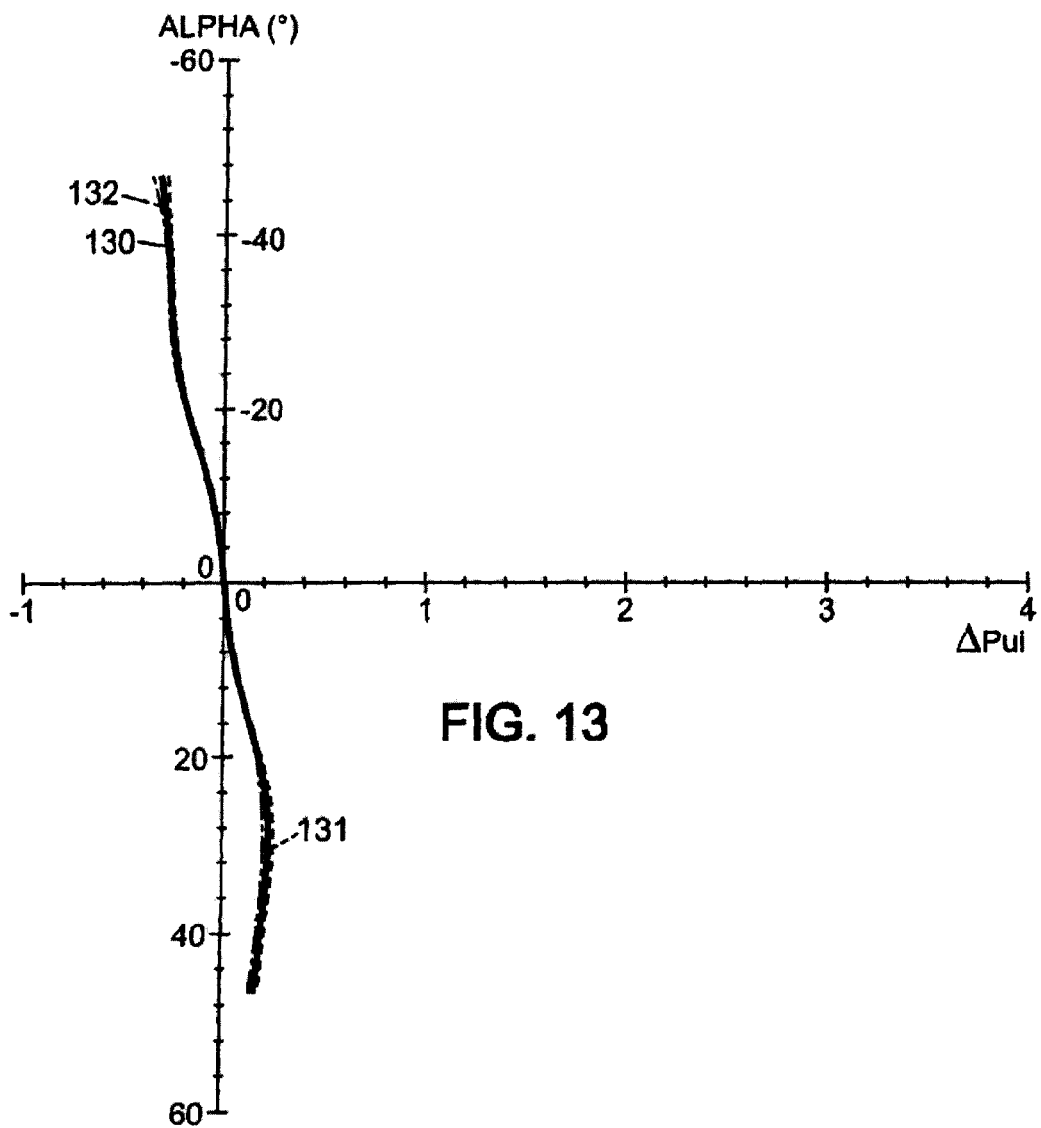
Figure 14:
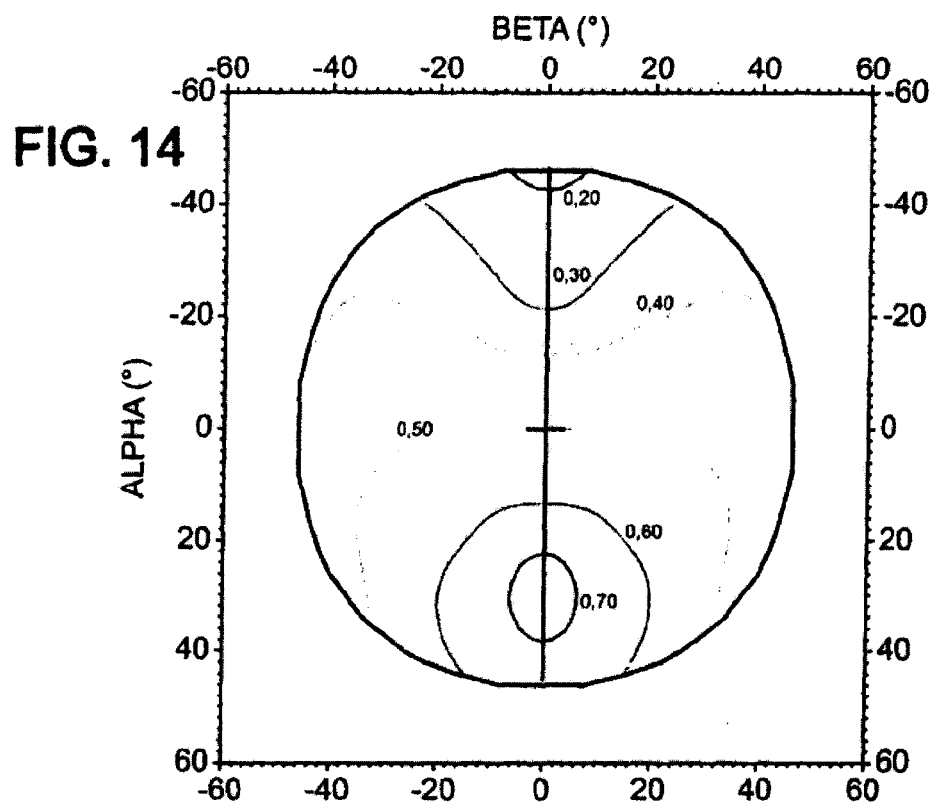
Figure 15:
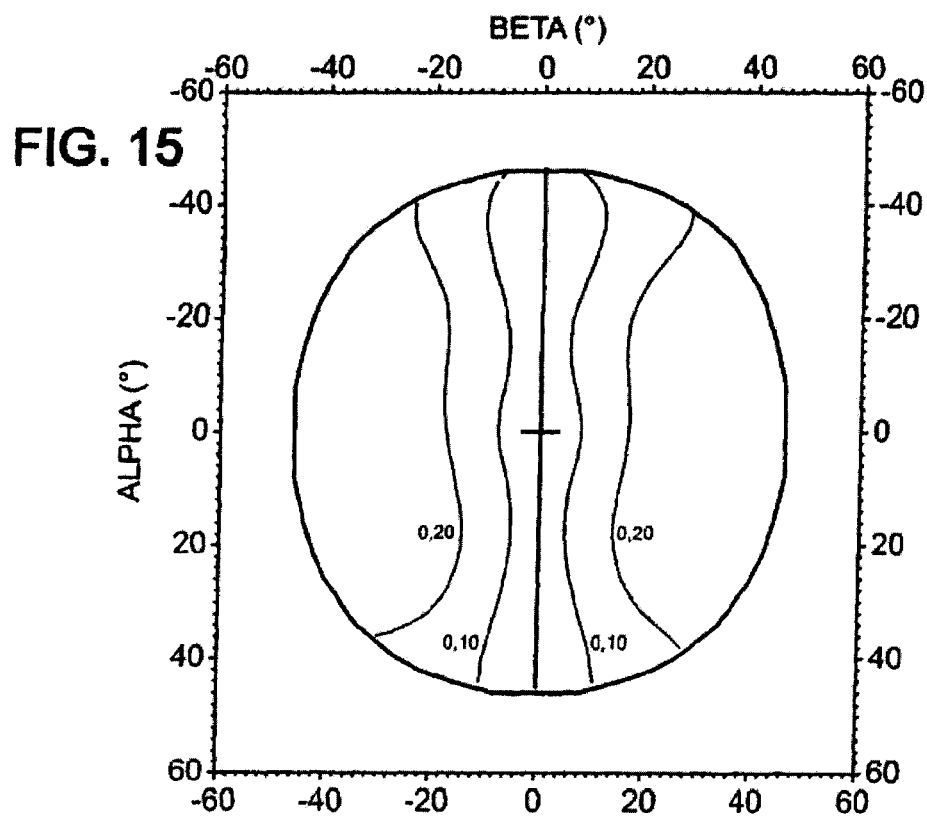
Figure 16:
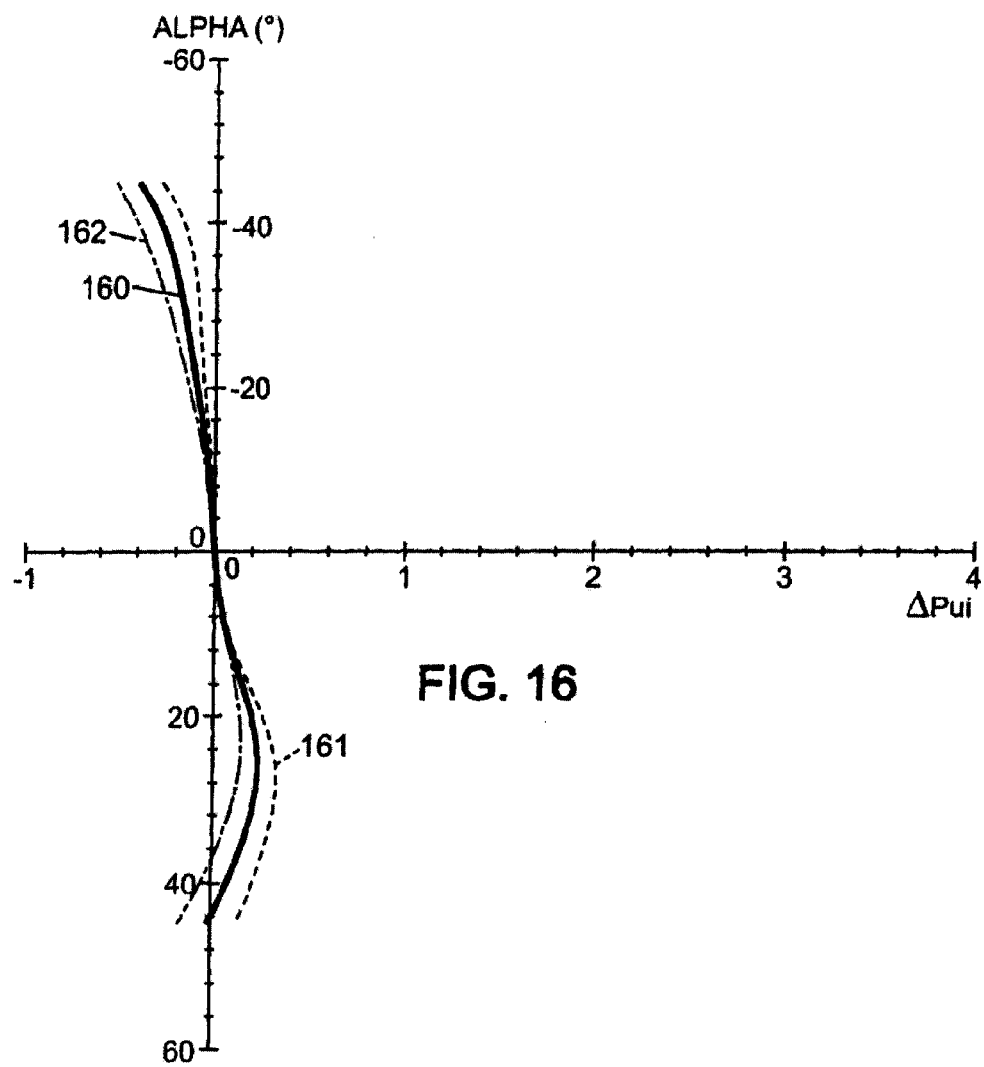
Figure 17:
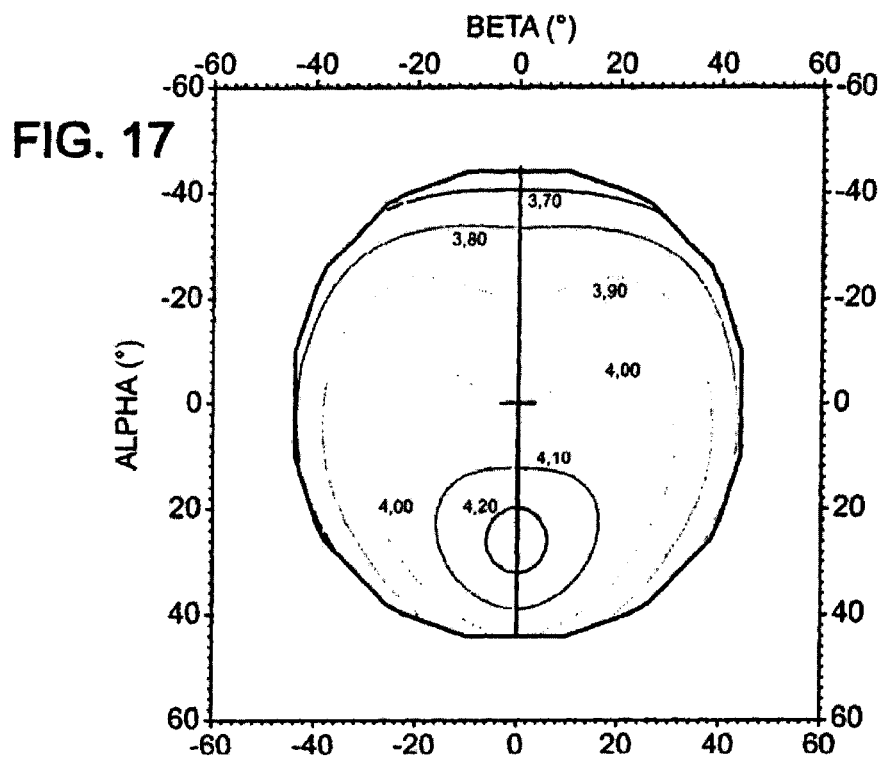
Figure 18:
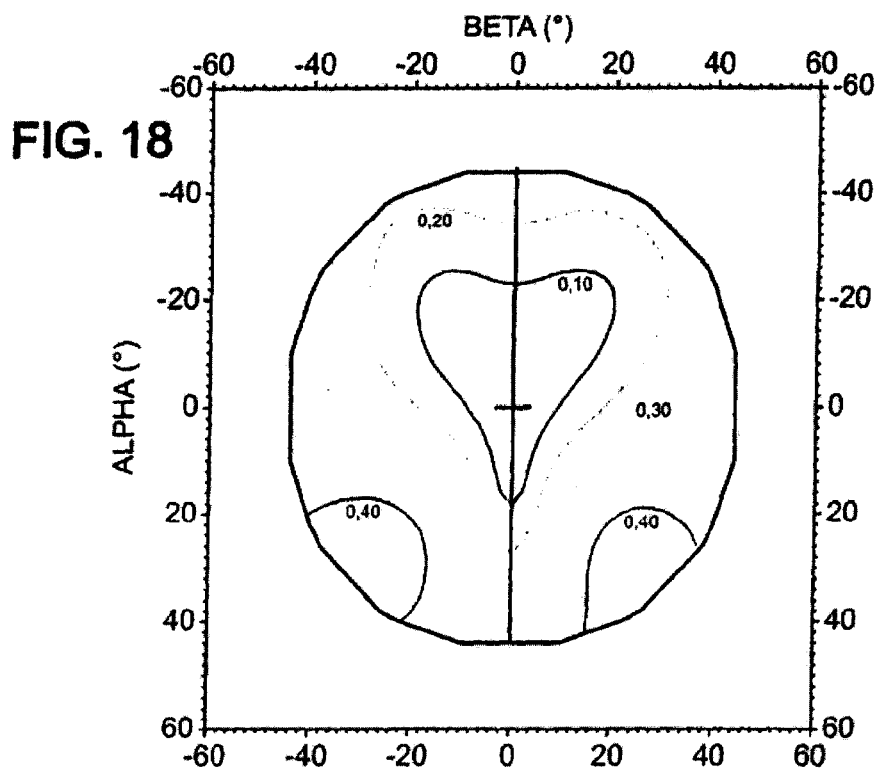

The figures corresponding to these different embodiments EX2 (FIGS. 7 to 9), EX3 (FIGS. 10 to 12), EX4 (FIGS. 13 to 15), and EX5 (FIGS. 16 to 18), represent the characteristics of each of these lenses in the same representation as adopted and described above for EX1 (FIGS. 5 to 6), for respective far vision prescriptions of −2 dioptres; +0.50 (−1.00) 30° dioptres; +0.50 dioptres; +4 dioptres.

TABLE I

|  | EX 1 | EX 2 | EX 3 | EX 4 | EX 5 |
|---|---|---|---|---|---|
| FIGS. | 4 to 6 | 7 to 9 | 10 to 12 | 13 to 15 | 16 to 18 |
| Average power at origin (in dioptres) | −6 | −2 | 0 | +0.5 | +4 |
| Average power variation along the downward gaze path | Curve 40 | Curve 70 | Curve 100 | Curve 130 | Curve 160 |
| Variation in minimum and maximum powers | Curves 41, 42 | Curves 71, 72 | Curves 101, 102 | Curves 131, 132 | Curves 161, 162 |
| Maximum average power variation in the upper area, $\Delta Pui_{SupMax}$ (in dioptres) | −0.28 | −0.25 | −0.28 | −0.26 | −0.18 |
| Maximum average power variation in the lower area, $\Delta Pui_{InfMax}$ (in dioptres) | 0.12 | 0.22 | 0.20 | 0.24 | 0.24 |
| Total average power variation, $\Delta Pui_{total}$ (in dioptres) | 0.40 | 0.47 | 0.48 | 0.50 | 0.42 |
| Maximum average power gradient along the downward gaze path/$\Delta Pui_{total}$ (in degrees$^{-1}$) | $3.85 \times 10^{-2}$ | $2.53 \times 10^{-2}$ | $2.73 \times 10^{-2}$ | $2.58 \times 10^{-2}$ | $2.98 \times 10^{-2}$ |
| Maximum resulting astigmatism/$\Delta Pui_{total}$ (in diopters) | 1.35 | 0.81 | 0.69 | 0.5 | 1.02 |

The above Table I summarizes the different characteristics of the example embodiments.

The lens in the examples described above can be obtained by optimization of a surface, using known optimization methods. Examples are the optimization method for progressive multifocal lenses, described in patent EP1752815, "Method of manufacturing an optical system". One or more of the criteria described above with reference to FIGS. 4 to 18 can be used for the optimization, and particularly:

a average power variation in which the maximum is between −0.1 and −0.4 dioptres in the upper area, a average power variation in which the maximum is between +0.1 and +0.4 dioptres in the lower area, a prescription for the wearer.

These criteria can be combined with others, particularly with one or more of the criteria proposed in the above examples.

The choice or some or all of these criteria allows obtaining a lens by optimization. A person skilled in the art easily understands that the lens in question does not necessarily have values exactly corresponding to the criteria imposed.

In the above example embodiments, only one of the surfaces of the lenses has been optimized. It is clear that in all these examples, one can easily exchange the role of the front and rear surfaces. One can also distribute the power variation over one or the other of the two lens surfaces, or partially on one face and on the other. The lens can be optimized on one face by taking into account surface characteristics, or by ray tracing on two surfaces while taking into account optical characteristics.

Numerous variants can be made to the embodiments in these examples. The invention is to be interpreted in a non-limiting manner, encompassing any equivalent embodiment.

The invention claimed is:

1. An ophthalmic lens for a given wearer, intended to be worn in an eyeglass frame, comprising:

a prescription control point P corresponding to a downward gaze $\alpha_P$ of between −10° and +25° and a lateral gaze displacement $\beta_P$ of between −10° and +10°;

an upper area defined by downward gaze values, $\alpha$, for the wearer, of between $\alpha_P$−30° and $\alpha_P$, along a downward gaze path, and by lateral gaze displacement values, $\beta$, for the wearer, of between $\beta_P$−30° and $\beta_P$+30°, parallel to a lateral gaze displacement axis; and a lower area defined by downward gaze values, $\alpha$, for the wearer, of between $\alpha_P$ and $\alpha_P$+30°, along a downward gaze path, and by lateral gaze displacement values, $\beta$, for the wearer, of between $\beta_P$−30° and $\beta_P$+30°, parallel to a lateral gaze displacement axis;

wherein:

the power of the lens at point P is substantially equal to the prescription of the wearer, the upper area has, relative to the point P, along the downward gaze path, a continuous average power variation $\Delta Pui_{Sup}$, monotonic between the point P and a point $P_{Sup}$, which is the point of the maximum amplitude in the variation of the power value, as an absolute value, and where the value of the average power deviation between the points $P_{Sup}$ and P, $\Delta Pui_{SupMax}=Pui(P_{Sup})-Pui(P)$, is between −0.1 and −0.4 dioptres, the lower area has, relative to the point P, along the downward gaze path, a continuous variation in the average power $\Delta Pui_{Inf}$, monotonic between the point P and a point $P_{Inf}$, which is the point of the maximum amplitude in the variation of the power value, as an absolute value, and where the value of the average power deviation between the points $P_{Inf}$ and P, $\Delta Pui_{InfMax}=Pui(P_{Inf})-Pui(P)$, is between +0.1 and +0.4 dioptres, and the average power gradient along the downward gaze path is less than $4.10^{-2} \times \Delta Pui_{total}$, where $\Delta Pui_{total}=|\Delta Pui_{SupMax}|+\Delta Pui_{InfMax}$ and said average power gradient is expressed in dioptres per degree.

2. The ophthalmic lens according to claim 1, where the wearer is a reference wearer defined by the following parameters:

distance between the eye's center of rotation and the rear face of the ophthalmic lens, along a line of viewing $(\alpha,\beta)=(0,0)$ equal to 25.5 mm;

pantoscopic tilt of 8°; and base curve of 0°.

3. The ophthalmic lens according to claim 1, wherein said ophthalmic lens is associated with information which allows positioning the control point P on said lens and locating the top and bottom of said lens, said information being chosen, for example, from among one or more elements of the list consisting of micro-gravure, temporary marking, mounting chart, manufacturer catalog, and optionally, positional reference means on the nasal and/or temporal side of the lens.

4. The ophthalmic lens according to claim 1, wherein the maximum value of the power variation $|\Delta Pui_{SupMax}|$ and/or the value of $\Delta Pui_{InfMax}$ is greater than or equal to 0.15 dioptres and less than or equal to 0.30 dioptres.

5. The ophthalmic lens according to claim 1, wherein the maximum value of the power variation $|\Delta Pui_{SupMax}|$ is greater than or equal to $0.5 \times \Delta Pui_{InfMax}$ and/or less than or equal to $2 \times \Delta Pui_{InfMax}$.

6. The ophthalmic lens according to claim 1, wherein the resulting astigmatism is less than or equal to $1.25 \times \Delta Pui_{total}$, expressed in dioptres, for the entirety of the upper and lower areas.

7. The ophthalmic lens according to claim 6, wherein the resulting astigmatism is less than or equal to $0.9 \times \Delta Pui_{total}$, expressed in dioptres, for the entirety of the upper and lower areas.

8. The ophthalmic lens according to claim 1, wherein the average power gradient along the downward gaze path is less than or equal to $3.10^{-2} \times \Delta Pui_{total}$, expressed in dioptres per degrees.

9. The ophthalmic lens according to claim 1, wherein the absolute values of the average power variation values $\Delta Pui_{Inf}$ and $\Delta Pui_{Sup}$ are equal, and/or wherein the points $P_{Sup}$ and $P_{Inf}$ are symmetrical in relation to P.

10. The ophthalmic lens according to claim 1, wherein the front and/or the rear surface is chosen from the list consisting of a spherical surface, an aspheric surface, and a complex surface.

11. A method implemented by computerized means, for calculating the optical system of an ophthalmic lens intended to be worn in an eyeglass frame and personalized for a given wearer, comprising the steps of:

providing the prescription of the wearer;

defining a distance between the eye's center of rotation and the rear face of the ophthalmic lens, along a line of viewing $(\alpha,\beta)$ of the wearer;

defining a pantoscopic tilt;

defining a base curve;

defining a prescription control point P corresponding to a downward gaze $\alpha_P$ of between −10° and +25° and a lateral gaze displacement $\beta_P$ of between −10° and +10° where the power of the lens at the point P is equal to the prescription of the wearer;

defining an upper area defined by downward gaze values, $\alpha$, for the wearer, of between $\alpha_P-30°$ and $\alpha_P$, along a downward gaze path, and by lateral gaze displacement values, $\beta$, for the wearer, of between $\beta_P-30°$ and $\beta_P+30°$, parallel to a lateral gaze displacement axis;

defining a lower area defined by downward gaze values, $\alpha$, for the wearer, of between $\alpha_P$ and $\alpha_P+30°$, along a downward gaze path, and by lateral gaze displacement values, $\beta$, for the wearer, of between $\beta_P-30°$ and $\beta_P+30°$, parallel to a lateral gaze displacement axis;

and where said ophthalmic lens is calculated in a manner such that:

the power of the lens at point P is substantially equal to the prescription of the wearer;

the upper area has, relative to point P, along the downward gaze path, a continuous variation in the average power $\Delta Pui_{Sup}$, monotonic between point P and a point $P_{Sup}$, which is the point of the maximum amplitude in the variation of the power value, as an absolute value, and where the value of the average power deviation between the points $P_{Sup}$ and P, $\Delta Pui_{SupMax}=Pui(P_{Sup})-Pui(P)$, is between −0.1 and −0.4 dioptres;

the lower area has, relative to point P, along the downward gaze path, a continuous variation in the average power $\Delta Pui_{Inf}$, monotonic between point P and a point $P_{Inf}$, which is the point of the maximum amplitude in the variation of the power value, as an absolute value, and where the value of the average power deviation between the points $P_{Inf}$ and P, $\Delta Pui_{InfMax}=Pui(P_{Inf})-Pui(P)$, is between +0.1 and +0.4 dioptres; and the average power gradient along the downward gaze path is less than $4.10^{-2} \times \Delta Pui_{total}$, where $\Delta Pui_{total}=|\Delta Pui_{SupMax}|+\Delta Pui_{InfMax}$ and said average power gradient is expressed in dioptres per degree.

12. The calculation method according to claim 11, wherein:

the distance between the eye's center of rotation and the rear face of the ophthalmic lens, along a line of viewing $(\alpha,\beta)=(0,0)$, is equal to 25.5 mm, the pantoscopic tilt is 8°, and the base curve is 0°.

13. A Method for manufacturing an ophthalmic lens intended to be worn in an eyeglass frame and personalized for a given wearer, comprising the steps of:

calculating by computerized means an optical system of an ophthalmic lens intended to be worn in an eyeglass frame and personalized for a given wearer;

supplying a semi-finished product adapted for machining an ophthalmic lens; and machining the semi-finished product in a manner that creates an ophthalmic lens having the characteristics of the optical system provided above, wherein the calculating step comprises the steps of:

providing the prescription of the wearer;

defining a distance between the eye's center of rotation (ECR) and the rear face of the ophthalmic lens, along a line of viewing $(\alpha,\beta)$ of the wearer;

defining a pantoscopic tilt;

defining a base curve;

defining a prescription control point P corresponding to a downward gaze $\alpha_P$ of between −10° and +25° and a lateral gaze displacement $\beta_P$ of between $-10°$ and $+10°$ where the power of the lens at the point P is equal to the prescription of the wearer;

defining an upper area defined by downward gaze values, $\alpha$, for the wearer, of between $\alpha_P-30°$ and $\alpha_P$, along a downward gaze path, and by lateral gaze displacement values, $\beta$, for the wearer, of between $\beta_P-30°$ and $\beta_P+30°$, parallel to a lateral gaze displacement axis;

defining a lower area defined by downward gaze values, $\alpha$, for the wearer of between $\alpha_P$ and $\alpha_P+30°$, along a downward gaze path and by lateral gaze displacement values for the wearer, of between $\beta_P-30°$ and $\beta_P+30°$, parallel to a lateral gaze displacement axis;

and where said ophthalmic lens is calculated in a manner such that:

the power of the lens at point P is substantially equal to the prescription of the wearer;

the upper area has, relative to point P, along the downward gaze path, a continuous variation in the average power $\Delta \text{Pui}_{Sup}$, monotonic between point P and a point $P_{Sup}$, which is the point of the maximum amplitude in the variation of the power value, as an absolute value, and where the value of the average power deviation between the points $P_{Sup}$ and P, $\Delta \text{Pui}_{SupMax}=\text{Pui}(P_{sup})-\text{Pui}(P)$, is between $-0.1$ and $-0.4$ dioptres;

the lower area has, relative to point P, along the downward gaze path, a continuous variation in the average power $\Delta \text{Pui}_{Inf}$, monotonic between point P and a point $P_{Inf}$, which is the point of the maximum amplitude in the variation of the power value, as an absolute value, and where the value of the average power deviation between the points $P_{Inf}$ and P, $\Delta \text{Pui}_{InfMax}=\text{Pui}(P_{Inf})-\text{Pui}(P)$, is between $+0.1$ and $+0.4$ dioptres; and the average power gradient along the downward gaze path is less than $4.10^{-2} \times \Delta \text{Pui}_{total}$, where $\Delta \text{Pui}_{total}=|\Delta \text{Pui}_{SupMax}|+\Delta \text{Pui}_{InfMax}$ and said average power gradient is expressed in dioptres per degree.

14. The method for manufacturing a personalized ophthalmic lens according to claim 13, wherein the ophthalmic lens is associated with information which allows positioning the control point P on said lens and locating the top and bottom of said lens, said information being chosen, for example, from among one or more elements in the list consisting of micro-gravure, temporary marking, mounting chart, manufacturer's catalog, and optionally, positional reference means on the nasal and/or temporal side of the lens.

15. A method for increasing the sharpness of vision and visual comfort of a non-presbyopic ametropic wearer while taking into account the accommodative dynamics of the eye, wherein an ophthalmic lens, intended to be worn in an eyeglass frame, is provided to said wearer and wherein said ophthalmic lens comprises:

a prescription control point P corresponding to a downward gaze $\alpha_P$ of between $-10°$ and $+25°$ and a lateral gaze displacement $\beta_P$ of between $-10°$ and $+10°$, an upper area defined by downward gaze values, $\alpha$, for the wearer, of between $\alpha_P-30°$ and $\alpha_P$, along a downward gaze path, and by lateral gaze displacement values, $\beta$, for the wearer, of between $\beta_P-30°$ and $\beta_P+30°$, parallel to a lateral gaze displacement axis;

a lower area defined by downward gaze values, $\alpha$, for the wearer, of between $\alpha_P$ and $\alpha_P+30°$, along a downward gaze path, and by lateral gaze displacement values, $\beta$, for the wearer, of between $\beta_P-30°$ and $\beta_P+30°$, parallel to a lateral gaze displacement axis;

wherein:

the power of the lens at point P is substantially equal to the prescription of the wearer, the upper area has, relative to the point P, along the downward gaze path, a continuous average power variation $\Delta \text{Pui}_{Sup}$, monotonic between the point P and a point $P_{Sup}$, which is the point of the maximum amplitude in the variation of the power value, as an absolute value, and where the value of the average power deviation between the points $P_{Sup}$ and P, $\Delta \text{Pui}_{SupMax}=\text{Pui}(P_{Sup})-\text{Pui}(P)$, is between $-0.1$ and $-0.4$ dioptres, the lower area has, relative to the point P, along the downward gaze path, a continuous variation in the average power $\Delta \text{Pui}_{Inf}$, monotonic between the point P and a point $P_{Inf}$, which is the point of the maximum amplitude in the variation of the power value, as an absolute value, and where the value of the average power deviation between the points $P_{Inf}$ and P, $\Delta \text{Pui}_{InfMax}=\text{Pui}(P_{Inf})-\text{Pui}(P)$, is between $+0.1$ and $+0.4$ dioptres, and the average power gradient along the downward gaze path is less than $4.10^{-2} \times \Delta \text{Pui}_{total}$, where $\Delta \text{Pui}_{total}=|\Delta \text{Pui}_{SupMax}|+\Delta \text{Pui}_{InfMax}$ and said average power gradient is expressed in dioptres per degree.

16. The ophthalmic lens according to claim 1, wherein the maximum value of the power variation $|\Delta \text{PuiSupMax}|$ and/or the value of $\Delta \text{PuiInfMax}$ is greater than or equal to 0.15 dioptres and less than or equal to 0.30 dioptres, and wherein the resulting astigmatism is less than or equal to $1.25 \times \Delta \text{Puitotal}$, expressed in dioptres, for the entirety of the upper and lower areas.

17. Ophthalmic lens according to claim 1, wherein the maximum value of the power variation $|\Delta \text{Pui}_{SupMax}|$ and/or the value of $\Delta \text{Pui}_{InfMax}$ is greater than or equal to 0.15 dioptres and less than or equal to 0.30 dioptres, and wherein the resulting astigmatism is less than or equal to $0.9 \times \Delta \text{Pui}_{total}$, expressed in dioptres, for the entirety of the upper and lower areas.

18. Ophthalmic lens according to claim 1, wherein the maximum value of the power variation $|\Delta \text{Pui}_{SupMax}|$ and/or the value of $\Delta \text{Pui}_{InfMax}$ is greater than or equal to 0.15 dioptres and less than or equal to 0.30 dioptres, and wherein the average power gradient along the downward gaze path is less than or equal to $3.10^{-2} \times \Delta \text{Pui}_{total}$, expressed in dioptres per degrees.

* * * * *